United States Patent [19]

Baugh et al.

[11] Patent Number: 4,653,761

[45] Date of Patent: Mar. 31, 1987

[54] COOLANT FLOW ORIFICING HEAD GASKET

[75] Inventors: J. Dan Baugh, Greensburg; Kent Shields, Columbus; Yoke L. Yam, Columbus; Larry Wells, Columbus, all of Ind.

[73] Assignee: Cummins Engine Company, Inc., Columbus, Ind.

[21] Appl. No.: 749,757

[22] Filed: Jun. 28, 1985

[51] Int. Cl.[4] ............................................. F16J 15/06
[52] U.S. Cl. ...................... 277/235 B; 123/193 CH; 277/235 R; 277/236
[58] Field of Search ..................... 277/235 B, 236; 123/193 CH, 41.28, 41.74, 41.82 R

[56] References Cited

U.S. PATENT DOCUMENTS

| | | | |
|---|---|---|---|
| 1,457,944 | 6/1923 | Short | 123/41.28 X |
| 1,815,601 | 7/1931 | Victor | 277/235 B |
| 2,010,782 | 8/1935 | Fahlman | 123/41.28 X |
| 2,175,448 | 10/1939 | Schlasintweit | 123/41.74 |
| 2,188,876 | 1/1940 | Fahlman | 123/41.28 |
| 2,395,243 | 2/1946 | Aukers | 277/235 B X |
| 4,049,856 | 9/1977 | Adams | 277/235 B X |
| 4,284,037 | 8/1981 | Kasting et al. | 123/41.72 X |
| 4,330,585 | 5/1982 | Eyrard et al. | 277/235 B X |

FOREIGN PATENT DOCUMENTS

| | | | |
|---|---|---|---|
| 158956 | 6/1953 | Australia | 277/235 B |
| 1296259 | 5/1962 | France . | |

*Primary Examiner*—Allan N. Shoap
*Attorney, Agent, or Firm*—Sixbey, Friedman & Leedom

[57] ABSTRACT

A head gasket, for sealing a junction between a top face of a cylinder block of an engine and a bottom face of a cylinder head thereof, of the type having a row of relatively large circular cut-outs, that, in use, correspond in size, number and position to that of cylinder spaces formed in the cylinder block and a plurality of apertures that are relatively small in comparison to the circular cut-outs that, in use, correspond in number and position to coolant passages formed in the faces of the cylinder block and cylinder head, as well as holes sized and positioned, in use, in accordance with holes in the cylinder block and head for connecting bolts and holes for lubricant circulation. In addition to a first row of apertures extending along a first lateral side of the circular cylinder cut-outs, the gasket is provided with a second row of apertures that are used to orifice outlet coolant passages from the cylinder head to the cylinder block. The second row of apertures comprises pairs of apertures flanking longitudinally opposite sides of each of the circular cylinder cut-outs, an aperture of each pair being larger in area than the other aperture of each pair. Furthermore, from a point between an intermediate pair of the circular cylinder cut-outs, the larger apertures and the smaller apertures, respectively, on each of opposite sides of the intermediate point, progressively increase and decrease in area toward opposite ends of the second row of apertures. The gasket is also provided with a third row of smaller orificing apertures, as well.

9 Claims, 2 Drawing Figures

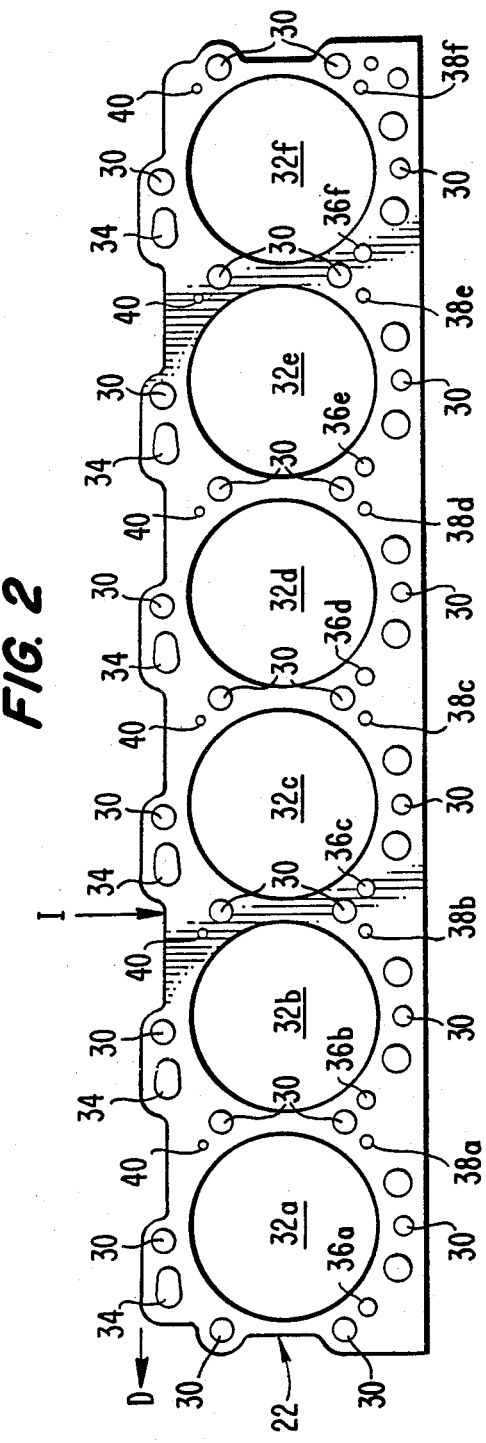

COOLANT FLOW ORIFICING HEAD GASKET

TECHNICAL FIELD

The present invention relates to head gaskets of the type utilized for sealing a junction between a top face of a cylinder block of an internal combustion engine and a bottom face of a cylinder head of an engine. In particular, the present invention relates to the type of gasket having a row of relatively large circular cut-outs that, in use, correspond in size, number and position to that of cylinder spaces formed in the cylinder block and having a plurality of apertures which, in use, correspond in number and position to coolant, lubricant, and bolt holes formed in the faces of the cylinder block and head to be joined together.

BACKGROUND ART

Engine head gaskets have traditionally served a multitude of functions beyond merely the conventional formation of a seal between the block and head for engine lubrication, coolant and combustion cylinder gases. Such functions tend to be peculiar to the particular engine for which the head gasket is designated. For example, U.S. Pat. No. 2,188,876 to Fahlman discloses the concept of varying the sizing of openings in the head gasket to obtain the desired flow of coolant through specific zones of the engine block and head. In particular, Fahlman discloses a cylinder head for an engine wherein coolant enters the cylinder block at the front end of the engine and exits the engine at a longitudinally central point at one side of the cylinder head, and that is designed for obtaining a substantially uniform temperature around the combustion chambers and an equalized cooling effect. To do so, Fahlman not only takes into account the distance of the passages between the head and block from the coolant inlet, but also takes into account the fact that parts of the engine will have different cooling requirements than other parts. In particular, the head is treated in stages corresponding to respective sides of each of the combustion chambers (5 stages in a 4 cylinder engine) with the coolant flow being proportioned from section to section and within each section.

However, in addition to the complexities of implementing Fahlman's method of cooling an internal combustion engine, the disclosure of this patent fails to take into consideration the fact that a fuel supply system, such as a fuel injector, and a valve arrangement normally are situated in the cylinder head and place practical limitations on the manner in which coolant may be circulated (the engine disclosed in U.S. Pat. No. 2,188,876 having no disclosed fuel supply means or valves associated with its engine cylinders).

U.S. Pat. No. 4,284,037, owned by the assignee of the present application, discloses an internal combustion engine coolant system having coolant feed and collection manifolds provided on one side of the cylinder block adjacent each other, and a coolant pump mounted adjacent to and connected with the manifolds on the block. For each cylinder, separate flow passages are formed on the block which conduct the coolant from the feed manifold around the cylinder, up and into the head, across the head and adjacent the injector and the valves, and then down from the head into the collection manifold on the block.

The respective flow paths of coolant through the head are substantially separated and the sizes of the flow passages associated with the various paths are designed to obtain a uniform heat transfer pattern among the various cylinders by controlling the quantity of flow in each path and by providing a valve orientation wherein, for each cylinder, two valves are on the longitudinal axis of the head and another two are on a line that is perpendicular to this axis. Along with partition walls which prevent the coolant from flowing straight across the head, this arrangement forces the coolant to flow at 45 degree angles between pairs of valves to and from the injector, the coolant flowing above and below the exhaust passages after having passed the injector. Additionally, the exhaust ports are relatively close to the exhaust manifold side of the head and the exhaust passages are relatively short, whereby the heated exhaust is removed from the head as quickly as possible.

However, problems exist in adapting such an engine configuration to engines wherein all of the cylinder valves are arranged in a longitudinally extending line, a single pair of closely spaced valves being provided at each cylinder and the injector being situated at a lateral side of the valves opposite the coolant feed and collection manifolds. For example, the cross paths can no longer be maintained and the laterally positioned injector interferes with cooling of the valves by the flow coming across the head after having come up from the cylinder block, since the injector partially shields same. On the other hand, obtaining of the most compact configuration for the engine (for purposes of minimizng weight and space requirements), as well as other considerations, make it impossible to place the various parts so as to facilitate coolant distribution. Certainly, no one has suggested a head gasket design which overcomes the problems associated with obtaining optimum coolant flow in engines having a single pair of valves and a fuel injection or described above.

DISCLOSURE OF THE INVENTION

The present invention is directed to a head gasket for use in an internal combustion engine as described in copending, commonly assigned U.S. application Ser. No. 749,743, filed on even date with the present application, entitled "Internal Combustion Engine with Improved Coolant Arrangement" and having two inventors in common with the inventorship of the present application.

It is a specific object in accordance with the present invention to achieve a particular variance in the sizing of the openings in the head gasket which will produce a desired flow of coolant through specific zones of the engine block and head that is designed to obtain optimum coolant flow in engines having a single pair of valves and a fuel injector positioned between the valves on a lateral side of the valves.

It is a further object in accordance with the present invention having a row of relatively large circular cylinder cut-outs and a plurality of apertures that are relatively small in comparison to the circular cylinder cut-out that, in use, correspond in number and position to coolant passages formed in the faces of the cylinder block and cylinder head, these apertures being arranged in a first row that extends along a first lateral side of the row of circular cylinder cut-outs, all of the apertures of this first row being of substantially the same area and positionally associated with the respective one of the circular cylinder cut-outs in accordance with coolant intake passages formed in the cylinder block and head, and a second row of apertures extending along a laterally opposite side of the circular cylinder cut-outs relative to the first row of apertures and in a manner forming a pair of apertures flanking longitudinally opposite sides of each of the circular cylinder cut-outs at locations that correspond to coolant outlet passages formed in the cylinder block and head, an aperture of each pair of the second row of apertures being larger in area than the other apertures of each pair of apertures of the second row, the larger and smaller apertures of the second row, on a first side of a point between an intermediate pair of circular cylinder cut-outs respectively progressively increasing in area toward the first end of the second row while the larger and smaller apertures on the other side of that intermediate point respectively decrease in area toward a second opposite end thereof.

Still further, it is also an object in accordance with the preceding objects to arrange the pairs of apertures of the second row with larger apertures alternating with the smaller apertures along the full length of the second row as well as to make the smaller aperture of each pair of apertures smaller than an adjoining larger aperture of the respective adjacent pair.

Yet a further object in accordance with the present invention is to provide a gasket as indicated which has, in addition to the noted first and second rows of apertures, a third row of apertures which is situated on the first side of the circular cylinder cut-outs laterally inwardly of the first row of apertures, the apertures of the third row being all the same size and smaller than the smallest aperture of the second row of apertures and positioned in correspondence with secondary coolant outlet passages formed in the cylinder block and head.

The present invention basically comprises a head gasket constructed of known head gasket forming materials in accordance with conventional head gasket forming techniques, but wherein apertures of the head gasket are utilized to perform an orificing function with respect to flow between the cylinder head and cylinder block requiring no special steps to be taken with respect to the manner of construction of the gasket itself, but the pattern and sizing of the openings being designed to optimize the cooling effect within an engine as described in the above-identified commonly assigned application.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 2 is a plan view illustrating the head gasket in accordance with the present invention.

BEST MODE FOR CARRYING OUT THE INVENTION

Figure 1:
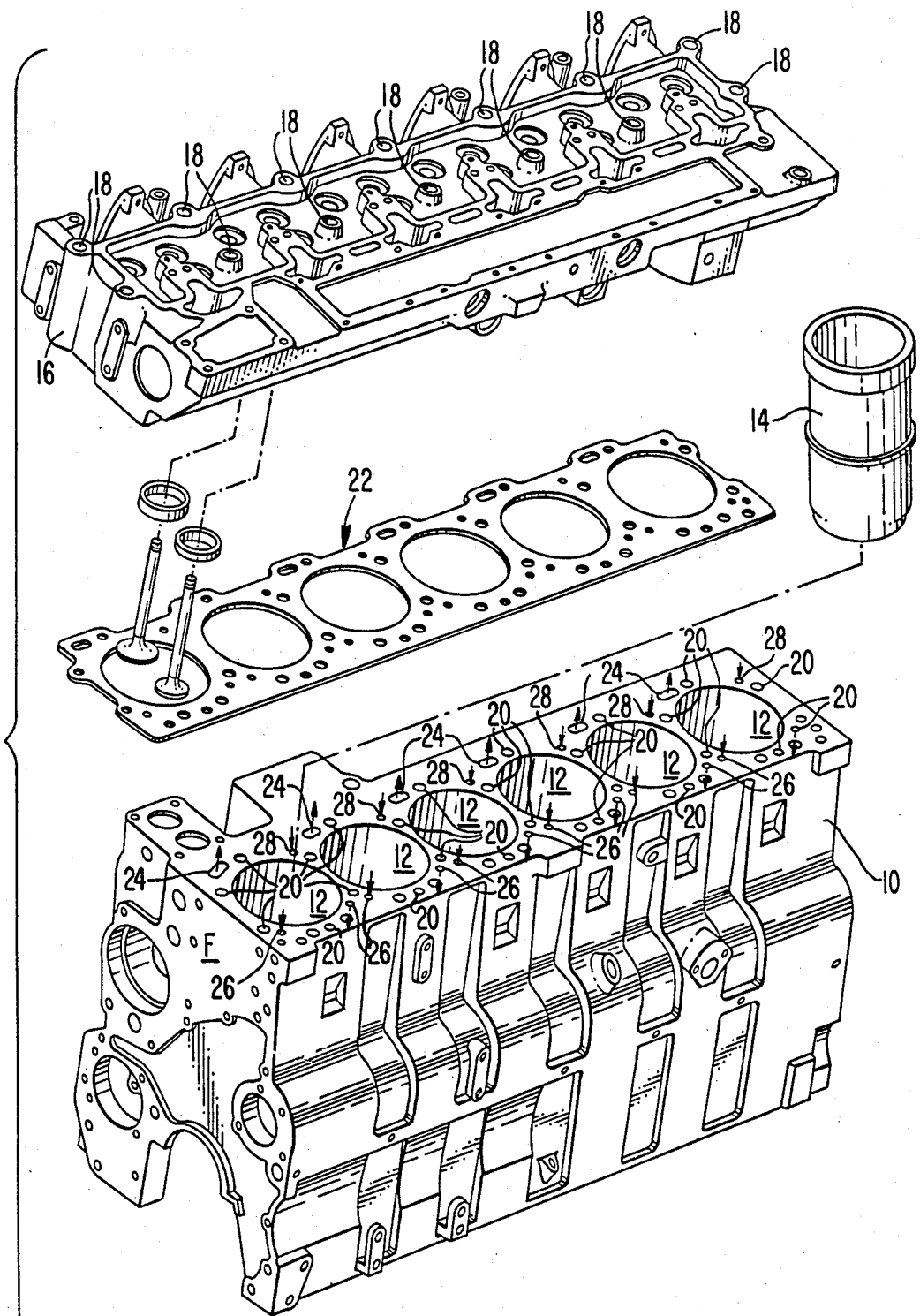
FIG. 1 is an exploded perspective view of a portion of an engine including a head gasket in accordance with the present invention.

At the outset, since, as noted above, the present invention relates to a head gasket for use in an engine as disclosed in the above-noted commonly assigned, copending application, to the extent that details of said engine are needed to complete an understanding of the manner of use of the present invention, said application is hereby incorporated by reference. However, so as to facilitate understanding of the present application without reference to said copending application, the following points are noted with respect to the engine of said application, in conjunction with FIG. 1 of the present application.

The engine has a cylinder block 10 within which, for example, six cylinder spaces 12 are formed for receiving cylinder liners 14 (only one of which is shown). A cylinder head within which exhaust and intake valves are positioned is secured to the top of the block 10 by way of bolts which pass through bolt holes 18 in the head and 20 in the cylinder block. As is conventional, a head gasket is utilized to seal the junction between the top surface of the block 10 and the bottom surface of the cylinder head 16, the head gasket of the present invention being indicated generally by the reference numeral 22.

Coolant is delivered to a distribution manifold extending along the length of the block 10 from which coolant is delivered by way of intake apertures 24 upwardly into the cylinder head via an aligned series of intake apertures formed therein (not shown). A majority of the flow entering the head travels transversely across its interior and is discharged through outlet passages formed by outlet apertures in the head (not shown) that are aligned with the outlet apertures 26 formed in the top face of the block 10. A secondary portion of the flow travels from the intake passages in a longitudinal direction of the engine directly to secondary outlet passages formed by secondary outlet apertures in the bottom face of cylinder head 16 and the secondary outlet apertures 28 formed in the top face of block 10. The arrows at the top face of block 10 in FIG. 1 represent the noted flows of coolant to and from the cylinder block 10 relative to cylinder head 16.

All of the outlet apertures 26 (and the corresponding apertures in cylinder head 16, not shown) are of the same size and are oversized with respect to an optimum flow-through area. Likewise, the smaller secondary outlet apertures 28 and their corresponding outlet apertures in the cylinder head 16 are also equally sized with respect to each other and oversized with respect to an optimum flow-through area. In order to obtain balancing of the flow of coolant through the cylinder head, the head gasket 22, in accordance with the present invention, is utilized to orifice the flow passages extending between the cylinder head 16 and the cylinder block 10 in a manner to be described in conjunction with the illustration of head gasket 22 in FIG. 2 of the drawings.

Firstly, the head gasket 22 of an in-line 6 cylinder engine has a row of relatively large circular cut-outs 32a–32f that, in use, correspond in size, number and position to the cylinder spaces 12 of the engine block 10. Also shown are 26 bolt holes 30 which correspond in size and position to the bolt holes formed in cylinder block 10 and cylinder head 16. The head gasket 22 may also have holes corresponding to lubricant flow passages and fastening holes for other engine components or accessories which will not be described since they are unrelated to the inventive features of this application.

Extending along a first lateral side of the row of circular cut-outs 32a–32f is a first row of relatively smaller apertures 34. The apertures 34, in use, correspond in position size and configuration to the coolant intake apertures 24 of the block 10 and the corresponding apertures in the head 16. In this regard, it is noted that all of the apertures 34 are of the same size and shape, and have an elongated configuration which increases in width in a direction corresponding to the direction of increasing width of the gasket portion between apertures 34 and the cylinder spaces 32 so as to maximize the amount of flow that can be transmitted therethrough without adversely affecting the strength of the head gasket. To this end, the configuration illustrated in the drawings has been found advantageous, particularly with respect to formation of corresponding apertures in the cylinder head and block, i.e., the apertures 34 have a small end of a semi-circular shape of, for example, 7.5 mm radius, a larger end of semi-circular shape of an 8 mm radius, and a 10 mm trapezoidal transition section therebetween.

At an opposite lateral side of the circular cut-outs 32a–32f from the first row of apertures 34, a second row of apertures is provided that is composed of pairs of apertures 36a, 38a through 36f, 38f. The pairs of apertures 36, 38 flank each of the circular cut-outs 32 on longitudinally opposite sides thereof at locations which, in use, correspond to the coolant outlet passages formed by the apertures 26 in cylinder block 10 and the corresponding apertures formed in cylinder head 16. The apertures 36, 38 of this second row of apertures are intended to serve an orificing function with respect to the outlet flow passages from the cylinder head to the cylinder block which will balance the flow of coolant despite the uniform size of the apertures 26 in the block 10 and head 16. For this purpose, the aperture 36 of each pair of apertures 36, 38 is larger in area than the other aperture, 38, of each pair.

Furthermore, in relation to an engine wherein coolant enters into the distribution manifold at a point I between a pair of intermediate cylinders, for example, 32, 32c, and the coolant exits from the discharge manifold at a location D at an end of the engine, the larger apertures on a first side of said point I progressively increase in area in a direction away from point I (progressively increase in size from larger aperture 36c to larger aperture 36f) and the larger apertures on the other side of point I decrease in area in a direction away from point I.

Likewise, the smaller apertures 38 on opposite sides of point I form groups of apertures that respectively increase and decrease in size in a direction away from point I. On the other hand, the pairs of openings 36b, 38b and 36c, 38c on opposite sides of point I are approximately, but not necessarily exactly, the same. In this regard, the following table reflects the orificing hole sizes which have been found to be optimum for a six cylinder, in-line diesel engine as described in the above-referenced application having a coolant inlet into the distribution manifold at point I and a distribution manifold outlet at its front end (represented by arrow D).

TABLE I

| Cylinder Aperture | Diameter Large Aperture | Diameter Small Aperture |
|---|---|---|
| 32a | 7.35 | 6.74 |
| 32b | 7.95 | 7.19 |
| 32c | 7.94 | 7.18 |
| 32d | 9.6 | 8.27 |
| 32e | 10.66 | 8.85 |
| 32f | 10.84 | 8.94 |

As can be seen from the above table, the smaller aperture of each pair of apertures 36, 38 is smaller than an adjoining larger aperture of a respective adjacent pair. All of the apertures 36, 38 are smaller than the apertures 34.

By the arrangement and position of aperture sizes it has been possible to optimize the cooling effect within the engine described in the above-identified commonly assigned application without necessitating complicated and costly sizing of apertures within either the block of head.

The coolant system employed in the engine disclosed in the above-identified commonly assigned application also provides for an auxiliary flow of coolant to prevent hot spots from developing in the head. To accommodate this flow and to properly proportion this flow, apertures 40 are formed in the gasket. The apertures 40 are all of the same size and smaller than the smallest aperture 36 (for example, a 4 mm diameter in comparison to the 6.74 diameter of the smallest orificing apertures 38a). These apertures 40 are positioned so that, in use, they are located in correspondence with secondary coolant outlet passages formed in the cylinder block and head by apertures 28 in the block and corresponding apertures of the head 16. However, apertures 40 are smaller than apertures 28 and thus serve an orificing function.

FIG. 2 illustrates the relative positioning of apertures 34, 36, 38 and 40. In particular, it can be seen that the larger apertures 36 are aligned, longitudinally, with a respective intake aperture 34, while an aperture 40, as is located on the same side of cylinder cut-outs 32 as intake apertures 34, is longitudinally aligned with each smaller aperture 38 at a point laterally inwardly of the row of apertures 34. Lastly, it is noted that the gasket 22 of the present application can be constructed of any known head gasket forming materials in accordance with any known head gasket forming technique. Furthermore, the use of apertures of head gasket 22 to perform an orificing function with respect to flow between the cylinder head and block requires no special steps to be taken with respect to the manner of construction of the gasket itself.

INDUSTRIAL APPLICABILITY

A gasket constructed in accordance with the foregoing description will be applicable to a wide range of internal combustion engines and will facilitate construction of the engine while enabling it to obtain a uniform and effective cooling since the head gasket will serve to orifice passages from the head to the block in a manner eliminating the need for precision drilling of the associated apertures in the head and block. Furthermore, the use of the head gasket to orifice passages from the head to the block will also enable adjustment in the orifice hole sizes, without difficulty, should actual engine operating conditions for a particular engine make such desirable. Still further, a gasket in accordance with the present invention can be used to convert an existing engine having coolant through passages of equal size, or simply progressively decreasing size, to one having the advantageous flow proportioning achieved by the gasket in accordance with the present invention without having to re-machine the block and/or head.

While we have shown and described a single embodiment in accordance with the present invention, it is understood that the same is not limited thereto, and is susceptible to numerous changes and modifications as known to those skilled in the art, and we therefore, do not wish to be limited to the details shown and described herein but intend to cover all such variations and modifications as are encompassed by the scope of the appended claims.

We claim:

1. A head gasket, for sealing a junction between a top face of a cylinder block of an engine and a bottom face of a cylinder head, of the type having a row of relatively large circular cylinder cut-outs that, in use, correspond in size, number and position to that of cylinder spaces formed in the cylinder block and a plurality of apertures that are relatively small in comparison to said circular cylinder cut-outs that, in use, correspond in number and position to coolant passages formed in the faces of the cylinder block and cylinder head, as well as holes sized and positioned, in use, in accordance with holes in the cylinder block and cylinder head for connecting bolts; wherein said plurality of apertures comprise a first row of apertures extending along a first lateral side of said row of circular cylinder cut-outs, the apertures of said first row comprising a series of coolant apertures and a number of connecting bolt apertures, all of the coolant apertures being of substantially the same area and being positionally associated with a respective one of said circular cylinder cut-outs and, in use, in accordance with coolant intake passages formed in the cylinder block and head; and a second row of apertures extending substantially in a straight line along an opposite lateral side of said circular cylinder cut-outs relative to the first row of apertures in a manner forming pairs of apertures flanking longitudinally opposite sides of each of the circular cylinder cut-outs at locations which, in use, correspond to coolant outlet passages formed in the cylinder block and head, an aperture of each pair of the second row of apertures being larger in area than the other aperture of each pair of apertures of the second row; wherein from a point between an intermediate pair of said circular cylinder cut-outs, the larger apertures of said second row, on a first side of said point, progressively increase in area toward a first end of the second row and the larger apertures on the other side of said point progressively decrease in area toward a second, opposite end thereof, the smaller apertures of said second row on opposite sides of said point, respectively, progressively increasing and decreasing in area in a similar manner.

2. A head gasket according to claim 1, wherein said pairs of apertures of the second row are arranged with the larger apertures alternating with the smaller apertures along the full length of the second row.

3. A head gasket according to claim 2, wherein the smaller aperture of each pair of apertures of the second row of apertures is smaller than an adjoining larger aperture of a respective adjacent pair.

4. A head gasket according to claim 3, wherein the coolant apertures of the first row of apertures are larger than the apertures of the second row.

5. A head gasket according to claim 4, comprising a third row of apertures, said third row being situated on said first side of the circular cylinder cut-outs, laterally inwardly of said first row of apertures, wherein the apertures of the third row are all the same size, are smaller than the smallest aperture of said second row of apertures, and, in use, are located in correspondence with secondary coolant outlet passages formed in the cylinder block and head.

6. A head gasket according to claim 5, wherein each coolant aperture of the first row is approximately longitudinally aligned with a respective larger aperture of the second row, and each aperture of the third row is longitudinally aligned with a respective smaller aperture of the second row of apertures.

7. A head gasket according to claim 1, wherein the coolant apertures of the first row of apertures are larger than the apertures of the second row of apertures.

8. A head gasket according to claim 7, comprising a third row of apertures, said third row being suituated on said first side of the circular cut-outs laterally inwardly of said first row of apertures, wherein the apertures of the third row are all the same size, are smaller than the smallest aperture of said second row of apertures, and, in use, are located in correspondence with secondary coolant outlet passages formed in the cylinder block and head.

9. A head gasket according to claim 8, wherein each coolant aperture of the first row is approximately longitudinally aligned with a respective larger aperture of the second row, and each aperture of the third row is longitudinally aligned with a respective smaller aperture of the second row of apertures.

* * * * *